Aug. 23, 1949.          W. M. POWELL           2,479,699
            APPARATUS FOR MAGNETIC MEASUREMENTS
                    Filed Aug. 9, 1946
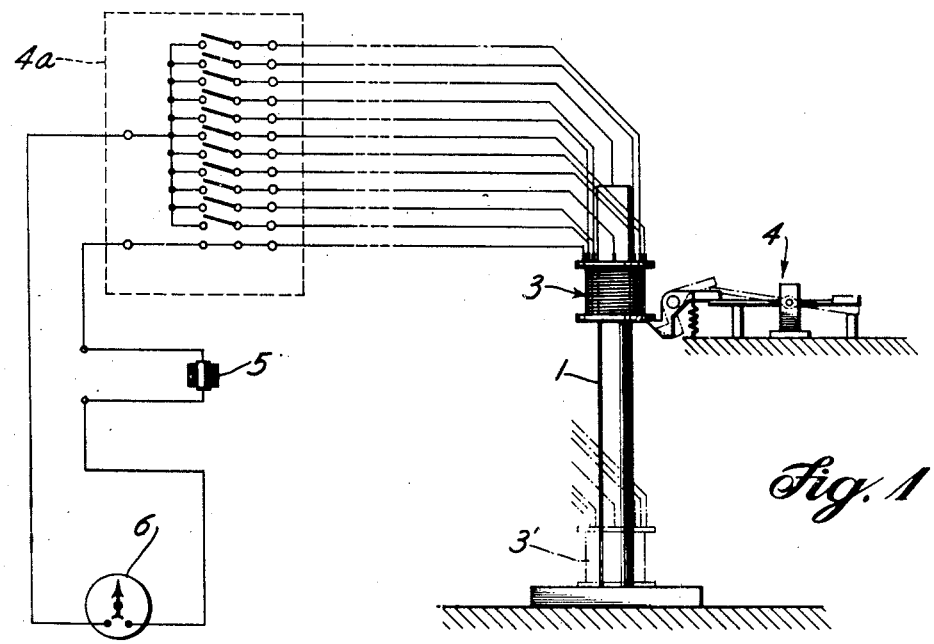
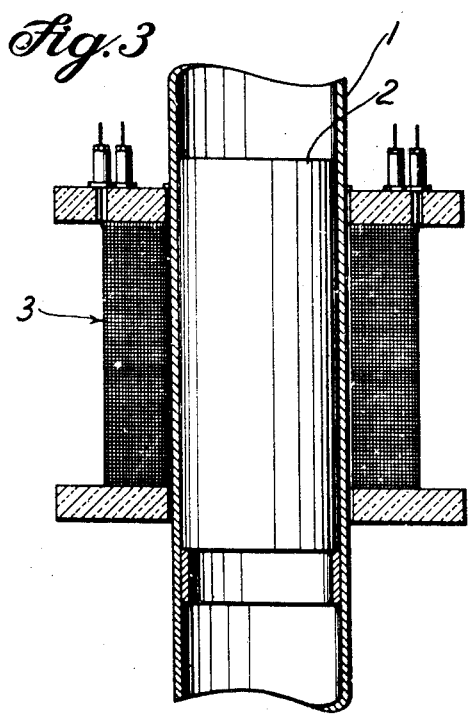
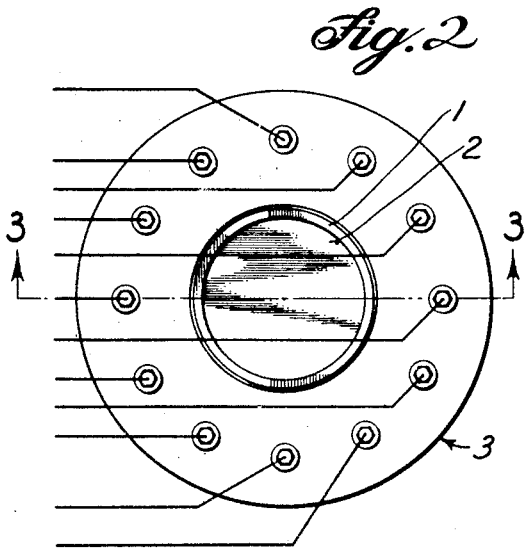
INVENTOR.
WILSON M. POWELL
BY Robert A. Saunders
ATTORNEY.

Patented Aug. 23, 1949

2,479,699

UNITED STATES PATENT OFFICE 2,479,699

APPARATUS FOR MAGNETIC MEASUREMENTS

Wilson M. Powell, Berkeley, Calif., assignor to the United States of America as represented by the United States Atomic Energy Commission Application August 9, 1946, Serial No. 689,481

2 Claims. (Cl. 171—209)

This invention relates to an apparatus for magnetic measurements in general. More particularly, this invention relates to an improved apparatus for calibrating a magnetic flux meter.

An object of this invention is to provide an improved and simplified apparatus for calibrating a magnetic flux meter employing a solenoid and a calibrating arrangement.

Other and further objects of this invention will be apparent to those skilled in the art to which it relates from the following specification, claims and drawing.

The invention comprises a system for calibrating a magnetic flux meter. Calibration of the meter is accomplished by subjecting it to the action of an electrical current generated by a carefully controlled, standard generating operation. The generator consists of a magnet that is mounted within a tubular upright. A coil slideably engages the outside of the upright and is movable between a position determined by a positioning release device and the base structure of the upright. Since downward movement of the coil is effected by gravity, and since the distance of travel of the coil is, in succeeding operations, standardized by the position of the releasing device and the base, successive operations generate currents that are standardized in intensity and duration. The coil is tapped and the various taps are connected to a switchbox to permit selection of the intensity of the current to which the meter undergoing calibration is to be subjected.

Referring to the drawing briefly, Figure 1 illustrates schematically an embodiment of this invention;

Fig. 2 is a plan view of the tapped solenoid employed in accordance with this invention; and Fig. 3 is a sectional view of the solenoid taken along the line 3—3 of Fig. 2.

Referring to the drawing in detail, there is shown a tubular upright 1 which supports interior thereof, a permanent bar magnet 2 of high retentivity and which slideably engages a multi-tapped solenoid 3. A triggering mechanism 4 normally engaging the solenoid 3 and retaining it in telescopic relationship with the magnet 2 is adapted to release the solenoid 3 permitting it to fall to the position 3' out of telescopic engagement with the magnet 2, whereby a predetermined number of magnetic flux lines are cut. The solenoid 3 is connected through a turn selector box 4a (schematically shown) in series with a search coil 5 and a galvanometer 6 which comprises in combination a flux meter. In employing the present apparatus, the standard portion of the apparatus including the solenoid 3 and the magnet 2 is initially calibrated against a known standard by any well known method after which it may be used with any flux meter combination. The apparatus is thereafter connected as illustrated in the drawing, a selected switch corresponding to a predetermined flux density in the box 4a is closed and the solenoid 3 is released permitting it to fall out of engagement with the magnet 2 thereby causing a current to flow through the galvanometer 6. The galvanometer indication is recorded and correlated with the corresponding flux density setting of the selector box. The process is repeated for different numbers of turns of the solenoid 3 until any desired range of calibration of the flux meter has been obtained.

While I have described the salient features of this invention in detail with respect to one embodiment, it will of course be apparent that numerous modifications may be made within the spirit and scope of this invention and I do not therefore desire to limit the invention to the exact details shown except in so far as they may be defined in the following claims.

What is claimed is:

1. A calibrating apparatus comprising a permanent bar magnet, a vertical tubular member surrounding and supporting said magnet, an arresting element radially disposed about said tubular member at a fixed distance from said magnet, a hollow core solenoid telescopically engaging said tubular member and adapted to move freely therealong until contact is made with said arresting element, means for retaining said solenoid in a first predetermined position with respect to said magnet, means for releasing said retaining means whereby said solenoid falls under the influence of gravity until stopped by said arresting means at a second predetermined position with respect to said magnet, and means connecting said solenoid to a flux meter to be calibrated.

2. A calibrating apparatus as set forth in claim 1 further characterized in that said solenoid is provided with a plurality of taps, and a plurality of switches connected to said taps whereby different turn values of said solenoid may be employed in the calibrations.

WILSON M. POWELL.

REFERENCES CITED

The following references are of record in the file of this patent:

UNITED STATES PATENTS

| Number | Name | Date |
|---|---|---|
| 1,270,100 | Ballman | June 18, 1918 |
| 1,832,128 | Klopsteg | Nov. 17, 1931 |
| 2,054,672 | Edgar | Sept. 15, 1936 |
| 2,070,121 | Gibson | Feb. 9, 1937 |

FOREIGN PATENTS

| Number | Country | Date |
|---|---|---|
| 382,303 | Germany | Oct. 20, 1923 |

OTHER REFERENCES

Ganot's Physics (Atkinson), William Wood & Company, New York, 1886, page 853.

First Course in Physics for Colleges by Milikan & Gale; Ginn & Company, Boston, 1928, page 425.